United States Patent
Scervo et al.

(10) Patent No.: US 10,107,468 B2
(45) Date of Patent: Oct. 23, 2018

(54) HEADLIGHT AIR DUCT

(71) Applicant: McLaren Automotive Limited, Surrey (GB)

(72) Inventors: Emilio Scervo, Surrey (GB); Arthur Slight, Surrey (GB); Paul Howse, Surrey (GB)

(73) Assignee: McLaren Automotive Limited (GB)

( * ) Notice: Subject to any disclaimer, the term of this patent is extended or adjusted under 35 U.S.C. 154(b) by 0 days.

(21) Appl. No.: 15/674,509

(22) Filed: Aug. 10, 2017

(65) Prior Publication Data
US 2018/0051859 A1 Feb. 22, 2018

(30) Foreign Application Priority Data
Aug. 18, 2016 (GB) .................... 1614164.0

(51) Int. Cl.
| | | |
|---|---|---|
| *F21V 29/00* | (2015.01) | |
| *F21S 45/47* | (2018.01) | |
| *F21S 8/10* | (2006.01) | |
| *B62D 37/02* | (2006.01) | |
| *B60Q 1/04* | (2006.01) | |

(52) U.S. Cl.
CPC ............. *F21S 45/47* (2018.01); *B60Q 1/04* (2013.01); *B62D 37/02* (2013.01); *F21S 48/328* (2013.01)

(58) Field of Classification Search
CPC ......... F21S 45/47; B62D 37/02; B60K 13/02; B60K 11/08; B60R 2019/486
See application file for complete search history.

(56) References Cited

U.S. PATENT DOCUMENTS

| | | | | |
|---|---|---|---|---|
| 4,354,570 A | * | 10/1982 | Tanaka | B62J 17/00 180/219 |
| 4,709,774 A | * | 12/1987 | Saito | B62J 17/02 180/229 |
| 7,717,204 B2 | * | 5/2010 | Kondou | B60R 19/52 180/68.1 |
| 7,841,756 B2 | * | 11/2010 | Kracker | B60Q 1/0017 362/505 |
| 8,479,853 B2 | * | 7/2013 | Verbrugge | B62D 25/12 180/68.2 |
| 2005/0207167 A1 | | 9/2005 | Larson et al. | |
| 2009/0256397 A1 | | 10/2009 | Bauernfeind | |

FOREIGN PATENT DOCUMENTS

| | | |
|---|---|---|
| DE | 102014015185 | 5/2015 |
| GB | 2501781 | 11/2013 |

OTHER PUBLICATIONS

Search Report issued in Great Britain application GB1614164.0 dated Oct. 5, 2016 (3 pages).

* cited by examiner

*Primary Examiner* — Evan Dzierzynski
(74) *Attorney, Agent, or Firm* — Fish & Richardson P.C.

(57) ABSTRACT

A vehicle comprising: a vehicle body defining a first aperture located in a portion of the vehicle body that faces in a primary motion direction of the vehicle; and a first lighting element extending across the aperture to bisect the first aperture into a first channel and a second channel.

20 Claims, 3 Drawing Sheets

HEADLIGHT AIR DUCT

CROSS-REFERENCE TO RELATED APPLICATIONS

This application claims priority to Great Britain Application Serial No. GB 1614164.0, filed on Aug. 18, 2016.

This invention relates to a vehicle comprising a lighting element.

A road vehicle can be configured to channel a flow of air over the body of the vehicle during vehicle motion for beneficial purposes. The air can be channelled to effect the aerodynamic properties of the vehicle which can change the handling characteristics of the vehicle. For example, by the vehicle comprising air vents and ducts that effect the air pressure in various locations on the vehicle body the downforce generated by the vehicle may be altered. The air can also be channelled to places where the vehicle has produced excess heat to provide a cooling effect to the vehicle. For example, the vehicle may comprise one or more radiators to which heat from other vehicle components is supplied by the vehicle's cooling system and vehicle air vents and ducts may supply flows of air to those radiators to draw heat from those radiators.

When vehicles are moving the parts of the vehicle facing in the motion direction encounter the most air resistance. The air has to be forced out of the way by those parts of the vehicle to enable the vehicle to travel in that direction. This causes the air pressure on those surfaces to be higher than those surfaces of the vehicle which face away from the motion direction. For instance, when the vehicle is travelling forwards—which is usually the case if the vehicle is travelling at speeds which cause a significant change in air pressure—the front parts of the vehicle, such as the bonnet or hood, front bumper and windscreen encounter most of this high pressure air. The high pressure air can be useful to harness by the air vents and air ducts to channel for beneficial purposes. For example, high pressure air is useful in changing the downforce characteristics of the vehicle and is useful in cooling because the mass of the air is greater and so is the specific heat capacity of that air.

The surface area in the motion direction of the vehicle that can be used for vents and ducts is limited. This is especially the case on vehicles with middle or rear located powertrains where the space under the front bonnet or hood is typically used for storing luggage.

It would therefore be desirable for an air duct that uses space on the front of the vehicle more efficiently.

According to a first aspect of the present invention there is provided a vehicle comprising: a vehicle body defining a first aperture located in a portion of the vehicle body that faces in a primary motion direction of the vehicle; and a first lighting element extending across the aperture to bisect the first aperture into a first channel and a second channel.

The first air channel and second air channel may converge behind the first lighting element. The first lighting element may be generally straight in the direction the first lighting element extends across the first aperture. The first lighting element may comprise a rounded profile on the leading edge of the first lighting element. The first lighting element may have a cross-section which is thinner at the leading edge than behind the leading edge. The first lighting element may extend across the first aperture in a generally horizontal direction. The first lighting element may have a generally uniform cross-section along the length of the first lighting element. The first lighting element may have a non-circular shape. The first lighting element may be elongate in the direction in which the first lighting element extends across the first aperture.

The vehicle may comprise a first air duct; and wherein the first aperture may surround the perimeter of an air inlet for the first air duct. The first lighting element may extend across the first air duct inlet to bisect the first air duct inlet into the first channel and second channel. The first air channel and second air channel may converge to form the first air duct. The first lighting element may extend partially into the air inlet. The vehicle may comprise one or more heat exchangers and the first air duct may be configured to provide airflow to the one or more heat exchangers. The first air duct may be configured to provide airflow to one or more locations on the vehicle body to effect airflow over the vehicle body during motion of the vehicle. The vehicle may comprise an internal combustion engine that may comprise at least one combustion chamber, and the first air duct may be configured to provide airflow to at least one combustion chamber.

The vehicle may comprise a second lighting element, wherein the first and second lighting elements may be positioned on the same side of the longitudinal centreline of the vehicle. The first and second lighting elements may form part of a first headlight assembly. First lighting element defines a portion of the perimeter of the second air channel and the second lighting element defines another portion of the perimeter of the second air channel.

The vehicle body may define a second aperture located in a portion of the vehicle body that faces in a primary motion direction of the vehicle; and the vehicle may comprise a third lighting element extending across the second aperture to bisect the second aperture into a third channel and a fourth channel. The first and second apertures may be located on opposite sides of the longitudinal centreline of the vehicle. The third air channel and fourth air channel may converge behind the third lighting element.

The third lighting element may be generally straight in the direction the third lighting element extends across the second aperture. The third lighting element may comprise a rounded profile on the leading edge of the third lighting element. The third lighting element may have a cross-section which is thinner at the leading edge than behind the leading edge. The third lighting element may extend across the second aperture in a generally horizontal direction. The third lighting element may have a generally uniform cross-section along the length of the third lighting element. The third lighting element may have a non-circular shape. The third lighting element may be elongate in the direction in which the third lighting element extends across the second aperture.

The vehicle may comprise a second air duct; and wherein the second aperture may surround the perimeter of a second air inlet for the second air duct. The third lighting element may extend across the second air duct inlet to bisect the second air duct inlet into the third channel and fourth channel. The third air channel and fourth air channel may converge to form the second air duct.

The vehicle may comprise one or more heat exchangers and the second air duct may be configured to provide airflow to a one or more heat exchangers. The vehicle may comprise one or more heat exchangers and the second air duct may be configured to provide airflow to a different one or more heat exchangers than the first air duct. The second air duct may be configured to provide airflow to one or more locations on the vehicle body to effect airflow over the vehicle body during motion of the vehicle. The second air duct may be configured to provide airflow to a different one or more locations on the vehicle body, than the first air duct, to effect airflow over the vehicle body during motion of the vehicle. The vehicle may comprise an internal combustion engine that comprises at least one combustion chamber, and the second air duct is configured to provide airflow to at least one combustion chamber. The vehicle may comprise an internal combustion engine that comprises at least one combustion chamber, and the second air duct is configured to provide airflow to a different at least one combustion chamber than the first air duct.

The vehicle may comprise a fourth lighting element, wherein the third and fourth lighting elements may be positioned on the same side of the longitudinal centreline of the vehicle. The third and fourth lighting elements may form part of a second headlight assembly.

The light element(s) may each comprise one or more light sources.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle that comprises a vehicle body defining an aperture located in a portion of the vehicle body that faces in a primary motion direction of the vehicle; and a first lighting element that extends across the aperture to bisect the aperture into a first channel and a second channel. The aperture may surround the perimeter of an air inlet for a first air duct. The first lighting element may extend across the first air duct inlet to bisect the first air duct inlet into the first channel and the second channel. The channels are air channels of the air duct inlet. The vehicle may comprise: a vehicle body that may define an air duct inlet located in a forward-facing portion of the vehicle body; and a lighting element that may extend across the air duct inlet to bisect the air duct inlet into a first channel and a second channel.

Figure 1:
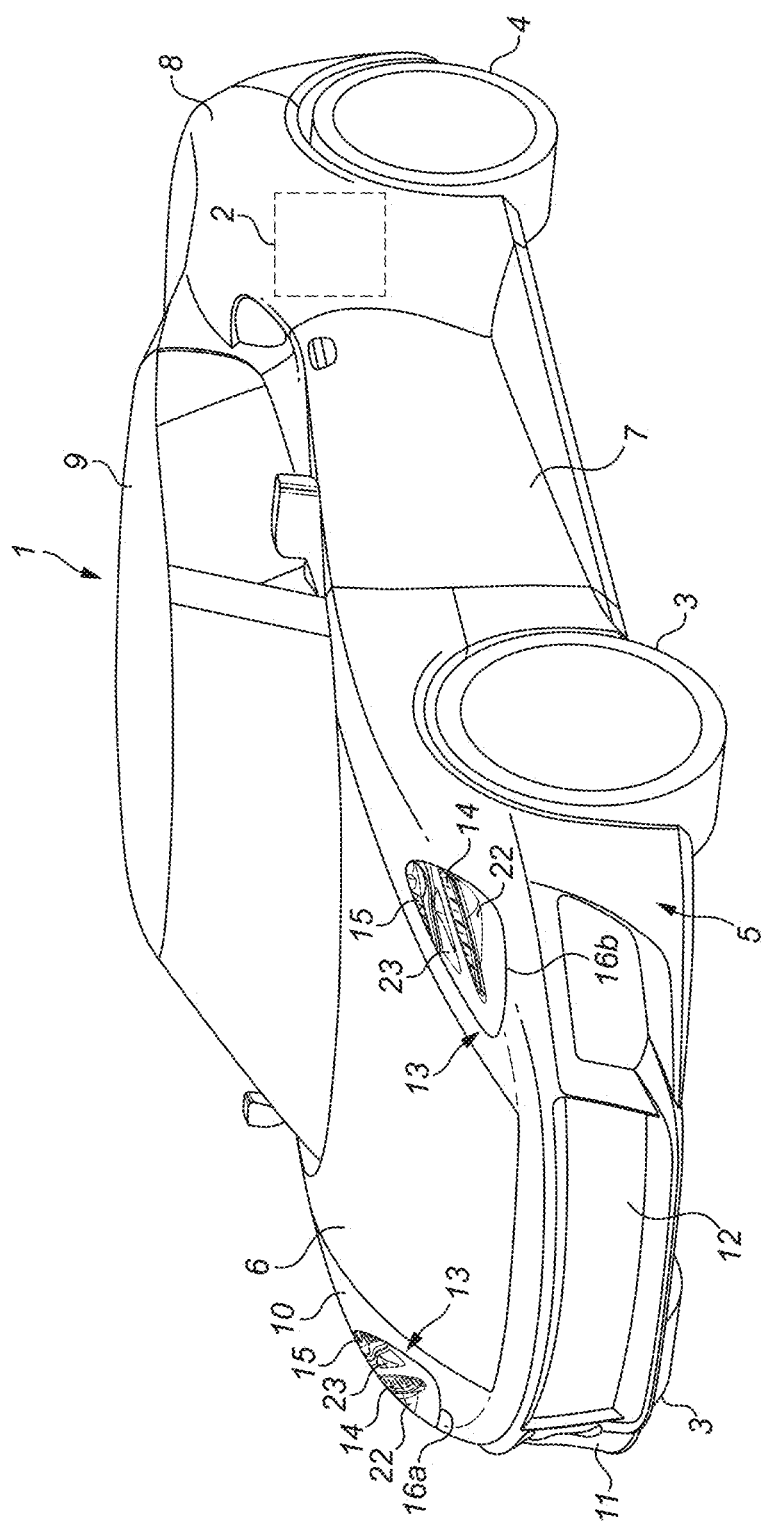
FIG. 1 shows a schematic illustration of a vehicle comprising headlights with air intakes.

FIG. 1 shows a vehicle 1. Vehicle 1 comprises a powertrain 2. The powertrain 2 may comprise any configuration of drive units such as an internal combustion engine, one or more electrical machines and/or another device that is capable of providing motive power to the drive wheels of the vehicle. The vehicle 1 may comprise a plurality of wheels 3, 4 for supporting the vehicle body 5 on a surface. Some of those wheels 3 may be located towards the front of the vehicle and some of those wheels 4 may be located towards the rear of the vehicle. The front and rear of the vehicle may be described with reference to a primary motion direction of the vehicle: the front being located forward of the centre of the vehicle in the primary motion direction of the vehicle, and the rear being located behind the centre of the vehicle in the primary motion direction of the vehicle. Some vehicles may have more than one primary motion direction, for instance an autonomous vehicle may be capable of being driven at full speed in two directions and so have two primary motion directions. At least some of the wheels may be coupled to the powertrain 2 to receive motive power from the powertrain 2 and thus may be drive wheels of the vehicle.

The drive units of powertrain 2 may be located at the rear, middle and/or front of the vehicle. For example, one or more wheels may be driven by electric motors located near to those respective wheels whilst other wheels may be driven by an internal combustion engine located towards the rear of the vehicle.

The vehicle 1 may comprise a bonnet 6 (also known as a hood) located towards the front of the vehicle 1. The bonnet 6 may be configured to open to (i) permit access to a powertrain bay in a vehicle with front located drive units and/or (ii) permit access to a luggage bay in a vehicle with middle or rear located drive units.

The vehicle body 5 may comprise a plurality of body elements which together form the vehicle body 5. For example, the vehicle body 5 may comprise any of a plurality of doors 7, rear quarter-panels 8, roof 9, front quarter-panels 10, and a front bumper 11. The body elements, and thus vehicle body 5, may comprise air intakes such as that shown as part of front bumper 11 at air intake 12.

Air intakes may be used to direct the flow of air over the vehicle body whilst the vehicle is in motion. Each air intake may be coupled to at least one air duct so that in combination they may be configured to direct the flow of air: to adjust the aerodynamic properties of the vehicle body; to channel air to vehicle components that require cooling; and/or to channel air to vehicle drive units that require air to generate motive power.

The vehicle 1 also comprises at least one headlight assembly 13 positioned on part of the vehicle body 5 that faces in a primary motion direction of the vehicle 1. As pictured in FIG. 1, the vehicle 1 may comprise two headlight assemblies 13 positioned on part of the vehicle body 5 that faces in a primary motion direction of the vehicle 1.

Each headlight assembly 13 comprises at least one lighting element 14, 15. Each lighting element 14, 15 may comprise at least one light source. For instance, a lighting element 14, 15 may comprise one or more light bulbs and/or one or more LEDs. The light sources may form an array of light sources across the visible surface of the lighting element 14, 15. The lighting elements 14, 15 may also comprise one or more lenses or other optical devices to focus the light emitted by the one or more light sources. The light sources within each lighting element may be configured to generate light and stop generating light in unison. The light sources within each lighting element may be configured to generate light and stop generating light individually or in any combination. For instance, some of the light sources may be configured to operate as turn indicators whilst others operate as headlights and so are configured to switch on and off at different times. It will be appreciated that whilst the headlight assembly 13 is described as a discrete unit, the headlight assembly 13 may be formed of a plurality of individual elements that are fitted to the vehicle 1 separately or in combination.

The region of the vehicle body 5 in which the headlight assembly 13 is received forms an aperture 16 in the vehicle body 5. In other words, the vehicle body 5 defines an aperture 16. This aperture 16 is located in a portion of the vehicle body that faces in a primary motion direction of the vehicle. As shown in FIG. 1, the vehicle body may define more than one aperture 16, and more specifically may define a first aperture 16a and a second aperture 16b. First and second apertures may be located in portions of the vehicle body that face in a primary motion direction of the vehicle. The first and second apertures 16 may be located to either side of the longitudinal centreline of the vehicle.

Figure 2:
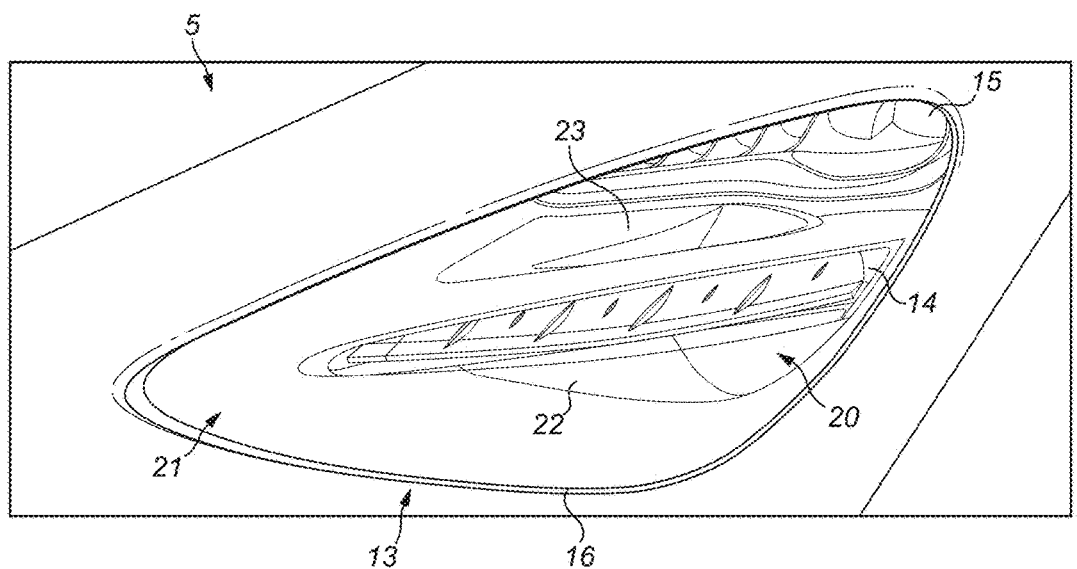
FIG. 2 shows a close-up illustration of a headlight with air intakes.

FIG. 2 shows a close-up view of one of the apertures 16 and headlamp assemblies 13. As shown more clearly in FIG. 2, each of these apertures 16 bounds the perimeter of an inlet 21 for an air duct 20. In other words, the aperture 16 surrounds the perimeter of the inlet 21 so that the inlet 21 is inside the aperture 16. The aperture 16 may define the perimeter of the inlet 21. The first lighting element 14 bisects the aperture 16 and so divides the air duct inlet 21 into a first air channel 22 and a second air channel 23. The first lighting element 11 extends across the aperture so as to divide the air duct inlet 21 into a first air channel 22 and a second air channel 23. In the region of the first lighting element 11, the first air channel 22 and second air channel 23 are separate; meaning air cannot flow between the two air channels due to the presence of the first lighting element between them. In other words, over the length of the first lighting element 11 in the longitudinal direction of the vehicle 1 the two air channels are separate.

The first lighting element 11 extends from one side of the aperture to the other side of the aperture. The first lighting element 11 may take any shape across the aperture. However, it is advantageous if the first lighting element 11 has one or more of the following characteristics:

- The first lighting element 11 may be generally straight in the direction the lighting element runs across the aperture. This enables the air flows to either side of the lighting element to be streamlined by the first lighting element 11.
- The first lighting element 11 may be rounded on the leading edge of the lighting element. The leading edge being the foremost edge of the lighting element in the primary motion direction of the vehicle. The rounded edge presents less air resistance to the air flow entering air duct 20.
- The first lighting element 11 may have a cross-section which is thinner at the leading edge of the lighting element than behind the leading edge. The cross-section may be thinner at the leading edge than at the rear edge of the lighting element. Such components of the cross-section help to present less air resistance to the air flow entering the air duct 20 and provide room for the light source(s) of the lighting element.
- The first lighting element 11 may run in a generally horizontal direction across the aperture. This enables the lighting element 11 to straighten the streamlines of the air flow into the air duct 20.

Figure 3:
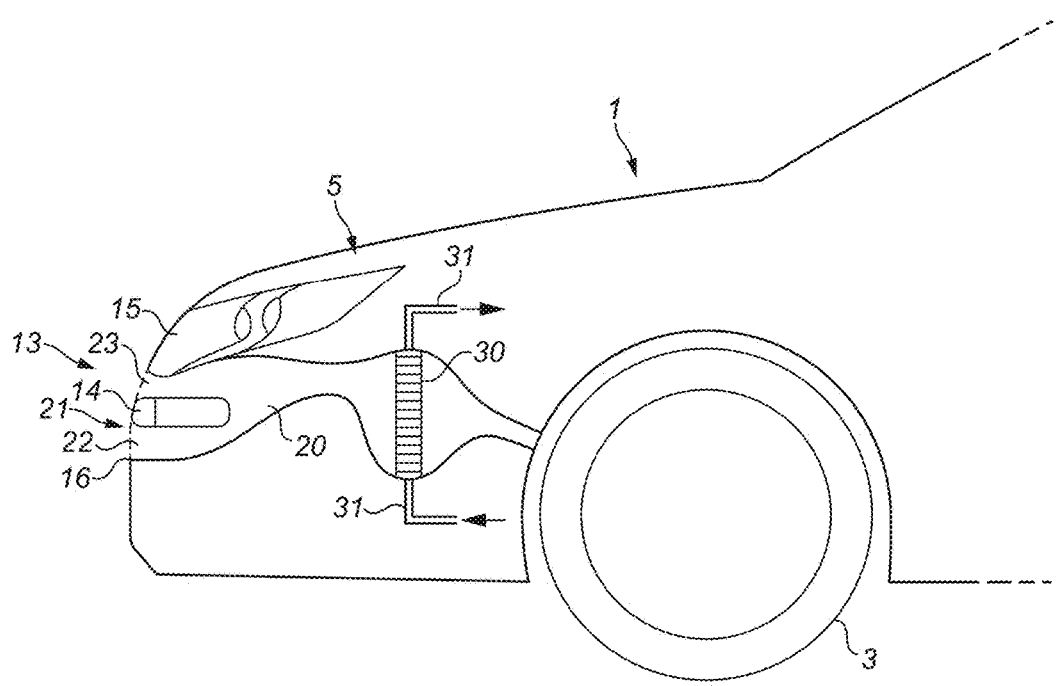
FIG. 3 shows a schematic cut-through diagram of a vehicle comprising a headlight with air intakes.

FIG. 3 shows a cut-through schematic diagram of vehicle 1. As shown more clearly in FIG. 3, the first air channel 22 and second air channel 23 converge to the rear of first lighting element 11. Thus first air channel 22 and second air channel 22 converge to form the air duct 20 to which aperture 16 surrounds the perimeter of the air inlet 21. The first lighting element 11 extends partially into air inlet 21 so as to divide the air inlet 21 into the first air channel 22 and second air channel 23 and permitting the first air channel 22 and second air channel 23 to converge behind the first lighting element 11. The first lighting element 11 extends partially into air inlet 21 in a longitudinal direction of vehicle 1.

Air duct 20 may channel air to one or more vehicle components. As shown in FIG. 3, vehicle 1 may comprise one or more heat exchangers 30. Heat exchanger 30 may receive thermal energy from one or more vehicle components such as powertrain 2 or an air-conditioning system. The heat exchanger 30 may receive the thermal energy via flow and return tubes which permit fluid to flow between the heat exchanger 30 and one or more vehicle components.

Air duct 20 may be configured to provide airflow to one or more heat exchangers 30 of vehicle 1. The heat exchanger(s) may be located in or next to a wheel arch. In this way, air duct 20 channels the airflow provided by the first air channel 22 and second air channel 23 to the one or more heat exchangers 30. Air duct 20 may be configured to provide airflow to one or more locations on the vehicle body 5 to effect airflow over the vehicle body during motion of the vehicle 1. Air duct 20 may be configured to provide airflow to at least one combustion chamber of the vehicle 1. In this case, the vehicle 1 may comprise an internal combustion engine comprising at least one combustion chamber. In a combustion chamber fuel is ignited to generate energy that the combustion engine converts into motive power.

As detailed herein, a headlight assembly may comprise more than one lighting element. As shown in the figures, vehicle 1 may comprise a second lighting element 15 in a similar lateral position as first lighting element 14. The second lighting element may be associated with the same aperture 16. Second lighting element 15 may bound a portion of the aperture 16. The second lighting element 15 and first lighting element 14 may be generally aligned in the vertical direction. The first and second lighting elements may be positioned on the same side of the longitudinal centre line of the vehicle 1.

First lighting element 15 may define a portion of the perimeter of second air channel 23 and second lighting element 15 may define another portion of the perimeter of second air channel 23. First lighting element 15 may define one side of second air channel 23 and second lighting element 15 may define another side of second air channel 23. Similarly, second lighting element 15 or another, third lighting element, may define another portion of the perimeter of first air channel 22 and/or may define another side of first air channel 22.

Second lighting element 15 may be positioned above first lighting element 14. Second lighting element 15 may be positioned below first lighting element 14. First and second lighting elements 14 and 15 may perform different light functions for vehicle 1. For instance, first lighting element 14 may comprise light sources that are configured to be illuminated when the vehicle 1 is switched on, second lighting element 15 may comprise light sources that are configured to provide the primary vehicle light source during darkness (i.e. main beam lights). First and second lighting elements 14, 15 may perform the same light functions for vehicle 1.

As shown in FIG. 1, the vehicle may comprise two headlight assemblies 13 positioned on part of the vehicle body that faces in a primary motion direction of the vehicle 1. The two headlight assemblies 13 may be located on opposite sides of the longitudinal centreline of the vehicle 1. The two headlight assemblies 13 have the same vertical position on the vehicle body. Thus, as detailed herein, the vehicle body may define a first aperture 16a and a second aperture 16b. Each of these apertures may surround the perimeter of a respective air inlet 21 for a respective air duct 20. Each of those apertures may be bisected by respective first lighting element 11 and so divide the respective air vent into first and second air channels 22, 23. The first lighting element 11 of each of the apertures 16 extends across the respective aperture so as to divide the air duct inlet 21 into a first air channel 22 and a second air channel 23. Each of the apertures 16, first lighting elements 11, air ducts 20, and first and second air channels 22, 23 may be configured as described herein. They may be configured in a similar fashion or different. For example, the air duct 20 for one aperture 16 may be configured to supply air flow to a heat exchanger whilst the air duct 20 for another aperture 16 may be configured to supply air flow to a drive unit of the powertrain 2.

The configuration of a lighting element 14 that runs across an air duct 20 is advantageous because it enables the portion of the vehicle that is normally used a headlamp assembly 13 to also be used as an intake for an air duct 20. Air can flow both over and under the lighting element 14 in to air duct 20. This is in comparison to a standard air duct where air can only flow to one side of a vehicle component such as lighting element 14. The lighting element 14 can also be shaped so as to guide the air, and thus streamline the air, in to air duct 20. Thus, increasing the quality and/or volume of air flow into air duct 20.

The configuration of a lighting element 14 that runs across an air duct 20 is particularly advantageous on a vehicle 1 that comprises a powertrain that has the drive units, such as an internal combustion engine, located in the middle or at the rear of the vehicle 1. Such a vehicle 1 may not have a drive unit located at in the centre of the front of the vehicle. This is because the vehicle 1 usually comprises a luggage compartment under the bonnet 6 located at the front of vehicle 1. The region used for a luggage compartment generally does not have other vehicle components running across it. Therefore, the space for air ducts at the front of the vehicle 1 is limited. Hence, the dual purpose of the structure present in aperture 16 is advantageous because it can provide a large air duct in a region typically taken up only by a headlamp assembly.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
   a vehicle body defining a first aperture located in a portion of the vehicle body that faces in a primary motion direction of the vehicle;
   a first air duct, the first aperture bounding the perimeter of an air inlet for the first air duct; and
   a first headlight assembly received in the first aperture, the first headlight assembly comprising:
   a first lighting element extending across the aperture to bisect the first air duct inlet into a first channel and a second channel, and a second lighting element;
   wherein the first lighting element defines a portion of the perimeter of the second air channel and the second lighting element defines another portion of the perimeter of the second air channel, and the first air channel and second air channel converge behind the first lighting element to form the first air duct.

2. The vehicle according to claim 1, wherein the first lighting element is generally straight in the direction the first lighting element extends across the first aperture.

3. The vehicle according to claim 1, wherein the first lighting element comprises a rounded profile on the leading edge of the first lighting element.

4. The vehicle according to claim 1, wherein the first lighting element has a cross-section which is thinner at the leading edge than behind the leading edge.

5. The vehicle according to claim 1, wherein the first lighting element extends across the first aperture in a generally horizontal direction.

6. The vehicle according to claim 1, wherein the first lighting element extends partially into the air inlet.

7. The vehicle according to claim 1, the vehicle comprising one or more heat exchangers and the first air duct is configured to provide airflow to the one or more heat exchangers.

8. The vehicle according to claim 1, wherein the first air duct is configured to provide airflow to one or more locations on the vehicle body to effect airflow over the vehicle body during motion of the vehicle.

9. The vehicle according to claim 1, the vehicle comprising an internal combustion engine that comprises at least one combustion chamber, and the first air duct is configured to provide airflow to at least one combustion chamber.

10. The vehicle according to claim 1, the vehicle comprising a second lighting element, wherein the first and second lighting elements are positioned on the same side of the longitudinal centreline of the vehicle.

11. The vehicle according to claim 1, wherein the vehicle body defines a second aperture located in a portion of the vehicle body that faces in a primary motion direction of the vehicle; and the vehicle comprises a third lighting element extending across the second aperture to bisect the second aperture into a third channel and a fourth channel.

12. The vehicle according to claim 11, wherein the first and second apertures are located on opposite sides of the longitudinal centreline of the vehicle.

13. The vehicle according to claim 11, wherein the third air channel and fourth air channel converge behind the third lighting element.

14. The vehicle according to claim 11, the vehicle comprising a second air duct; and wherein the second aperture surrounds the perimeter of a second air inlet for the second air duct.

15. The vehicle according to claim 14, wherein the third lighting element extends across the second air duct inlet to bisect the second air duct inlet into the third channel and fourth channel.

16. The vehicle according to claim 14, wherein the third air channel and fourth air channel converge to form the second air duct.

17. The vehicle according to claim 14, the vehicle comprising one or more heat exchangers and the second air duct is configured to provide airflow to a different one or more heat exchangers than the first air duct.

18. The vehicle according to claim 11, the vehicle comprising a fourth lighting element, wherein the third and fourth lighting elements are positioned on the same side of the longitudinal centreline of the vehicle.

19. The vehicle according to claim 18, wherein the third and fourth lighting elements form part of a second headlight assembly.

20. The vehicle according to claim 1, wherein the light elements each comprise one or more light sources.

* * * * *